(12) United States Patent
Song et al.

(10) Patent No.: US 11,646,541 B2
(45) Date of Patent: May 9, 2023

(54) FEMTOSECOND LASER DEVICE

(71) Applicant: ELECTRONICS AND TELECOMMUNICATIONS RESEARCH INSTITUTE, Daejeon (KR)

(72) Inventors: Dong Hoon Song, Daejeon (KR); Hong-Seok Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 221 days.

(21) Appl. No.: 16/950,567

(22) Filed: Nov. 17, 2020

(65) Prior Publication Data

US 2021/0151947 A1 May 20, 2021

(30) Foreign Application Priority Data

Nov. 20, 2019 (KR) ............... 10-2019-0149769
Oct. 27, 2020 (KR) ............... 10-2020-0140645

(51) Int. Cl.
*H01S 3/067* (2006.01)
*H01S 3/00* (2006.01)
*H01S 3/16* (2006.01)

(52) U.S. Cl.
CPC ........ *H01S 3/0057* (2013.01); *H01S 3/06754* (2013.01); *H01S 3/1618* (2013.01)

(58) Field of Classification Search
CPC ................. H01S 3/0057; H01S 3/06754
See application file for complete search history.

(56) References Cited

U.S. PATENT DOCUMENTS

| 5,838,846 A | 11/1998 | Murdock |
| 7,072,101 B2 * | 7/2006 | Kapteyn .............. H01S 3/0057 359/337.5 |
| 7,817,682 B2 | 10/2010 | Murison et al. |
| 8,503,069 B2 | 8/2013 | Fermann et al. |
| 9,240,667 B2 | 1/2016 | Chang et al. |
| 2003/0156605 A1 * | 8/2003 | Richardson ......... H01S 3/06791 372/25 |
| 2010/0238452 A1 * | 9/2010 | Vanholsbeeck ......... H04J 14/02 356/477 |
| 2015/0372447 A1 | 12/2015 | Song et al. |
| 2019/0305500 A1 | 10/2019 | Antier et al. |
| 2020/0249390 A1 * | 8/2020 | Kanno ................ G02B 6/3885 |

FOREIGN PATENT DOCUMENTS

| JP | 2002131139 A | 5/2002 |
| JP | 2004165389 A | 6/2004 |
| KR | 1020070083562 A | 8/2007 |
| KR | 20190028698 A | 3/2019 |

\* cited by examiner

*Primary Examiner* — Michael Carter

(57) ABSTRACT

Disclosed is a femtosecond laser device. The femtosecond laser device includes a pulse oscillator configured to generate a laser pulse, a pulse width stretcher configured to stretch a width of the laser pulse, a pulse width compressor connected to the pulse width stretcher to compress the width of the laser pulse, a pulse amplifier disposed between the pulse width compressor and the pulse width stretcher to amplifier an intensity of the laser pulse, and a nonlinear pulse attenuator including an optical fiber connected between the pulse width amplifier and the pulse width stretcher and deformed to have a spiral shape, a stretched length, or a twist.

10 Claims, 9 Drawing Sheets

FEMTOSECOND LASER DEVICE

CROSS-REFERENCE TO RELATED APPLICATIONS

This U.S. non-provisional patent application claims priority under 35 U.S.C. § 119 of Korean Patent Application Nos. 10-2019-0149769, filed on Nov. 20, 2019, and 10-2020-0140645, filed on Oct. 27, 2020, the entire contents of which are hereby incorporated by reference.

BACKGROUND

The present disclosure herein relates to a laser device, and more particularly, to a femtosecond laser device.

The development of industrial technology requires precision and high productivity in the fields in which laser pulses are used, and, to meet such requirements, femtosecond laser pulses are recently used in various fields. Femtosecond laser pulses exhibit characteristics different from those of typical laser pulses. For example, since femtosecond laser pulses are radiated to a medium only for a short time, a thermal influence or thermal deformation that may occur during typical laser processing may be avoided. Furthermore, femtosecond laser pulses make it possible to process an interior of a medium without damaging the surface of the medium.

SUMMARY

The present disclosure provides a femtosecond laser device capable of minimizing a nonlinear dispersion value of a laser pulse.

An embodiment of the inventive concept provides a femtosecond laser device including: a pulse oscillator configured to generate a laser pulse; a pulse width stretcher configured to stretch a width of the laser pulse; a pulse width compressor connected to the pulse width stretcher to compress the width of the laser pulse; a pulse amplifier disposed between the pulse width compressor and the pulse width stretcher to amplifier an intensity of the laser pulse; and a nonlinear pulse attenuator including an optical fiber connected between the pulse width amplifier and the pulse width stretcher, the optical fiber deformed to have a spiral shape, a stretched length, or a twist.

In an embodiment, the nonlinear pulse attenuator may further include a bobbin for winding the optical fiber.

In an embodiment, the bobbin may have an outer diameter of about 30 mm.

In an embodiment, the bobbin may have a length that is at least 15 times a thickness of the optical fiber.

In an embodiment, the bobbin may include: a first bobbin having a first diameter; and a second bobbin having a second diameter that is less than the first diameter.

In an embodiment, a difference between the first diameter and the second diameter may be about 10 mm or about 60 mm.

In an embodiment, the first bobbin and the second bobbin may have a crossed angle between center axes thereof, wherein the crossed angle may be $\pm\pi/4$.

In an embodiment, the bobbin may include a circular tube or a circular cylinder.

In an embodiment, the nonlinear pulse attenuator may further include an optical fiber stretcher for stretching the optical fiber.

In an embodiment, the optical fiber stretcher may stretch the optical fiber so that the optical fiber has the stretched length that is about 5% of a unit length.

In an embodiment, the optical fiber stretcher may include: a first clamping portion fixing one side of the optical fiber; a second clamping portion facing the first clamping portion and fixing another side of the optical fiber; and a stretching portion connecting the first clamping portion to the second clamping portion.

In an embodiment, the stretching portion may includes: a first rod connected to the first clamping portion; a second rod connected to the second clamping portion; and a locker disposed in an overlap region between the first rod and the second rod and fixing the first rod and the second rod.

In an embodiment, the locker may include a bolt.

In an embodiment, the nonlinear pulse attenuator may further include an optical fiber twister for twisting the optical fiber.

In an embodiment, the optical fiber twister may include a coil spring.

In an embodiment, the optical fiber twister may twist the optical fiber at a twisting angle of $\pm\pi/4$.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
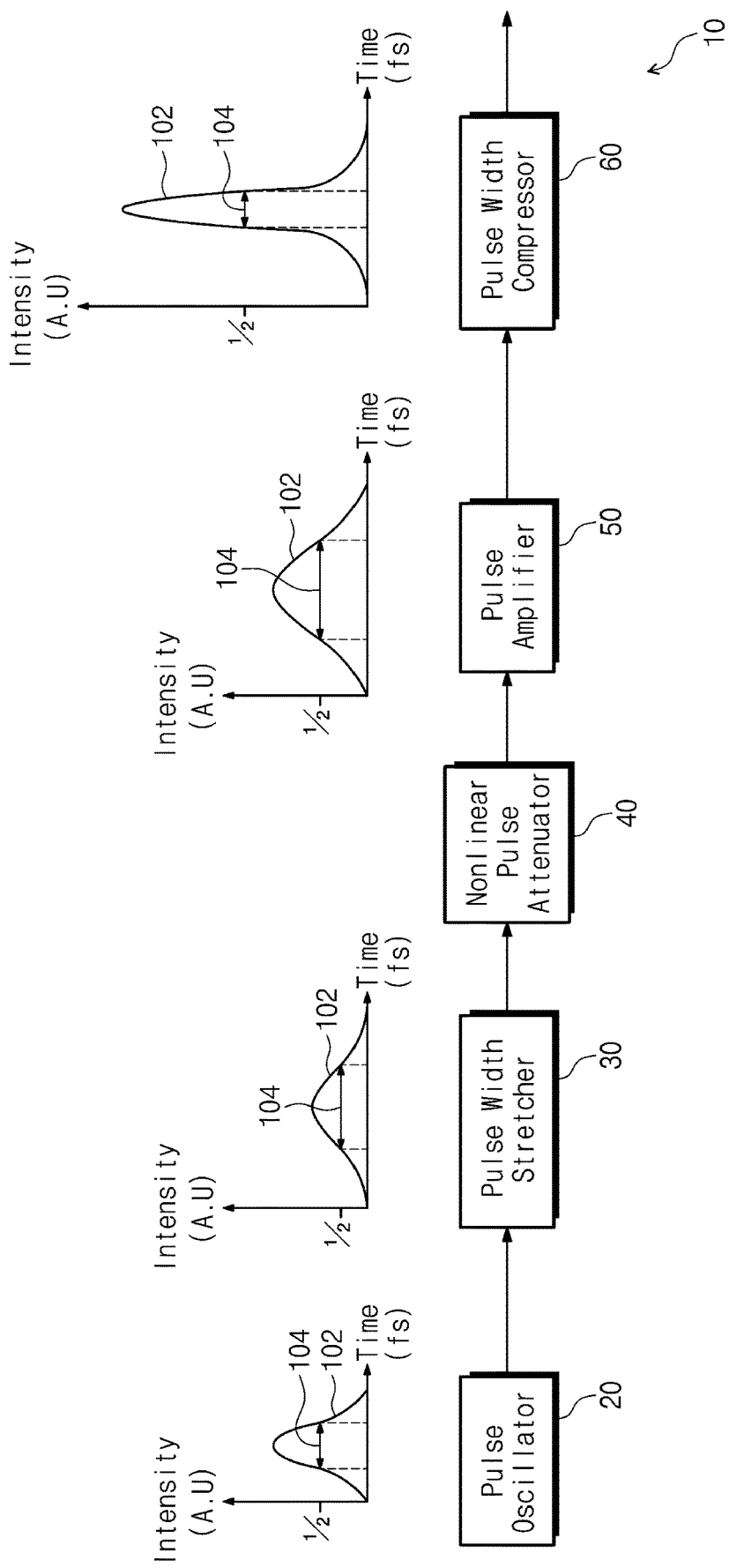
FIG. 1 is a diagram illustrating an example of a femtosecond laser device according to the inventive concept.

Exemplary embodiments of the inventive concept will now be described in detail with reference to the accompanying drawings. The advantages and features of the inventive concept, and methods for achieving the advantages and features will be apparent from the embodiments described in detail below with reference to the accompanying drawings. Therefore, the inventive concept may be embodied in different forms and should not be construed as limited to the embodiments set forth herein. Rather, these embodiments are provided so that this disclosure will be thorough and complete, and will fully convey the scope of the inventive concept to those skilled in the art, and the inventive concept is only defined by the scope of the claims. Like reference numerals refer to like elements throughout.

The terminology used herein is not for delimiting the embodiments of the inventive concept but for describing the embodiments of the inventive concept. The terms of a singular form may include plural forms unless otherwise specified. It will be further understood that the terms "includes", "including", "comprises", and/or "comprising", when used in this description, specify the presence of stated elements, steps, operations, and/or components, but do not preclude the presence or addition of one or more other elements, steps, operations, and/or components. Furthermore, the terms "optical fiber", "laser pulse", and "pulse width" used herein may be construed as general optics terminology. Reference numerals, which are presented in the order of description, are provided according to the embodiments and are thus not necessarily limited to the order.

FIG. 1 illustrates an example of a femtosecond laser device 10 according to the inventive concept.

Referring to FIG. 1, the femtosecond laser device 10 of an embodiment of the inventive concept may include a pulse oscillator 20, a pulse width stretcher 30, a nonlinear pulse attenuator 40, a pulse amplifier 50, and a pulse width compressor 60. The pulse oscillator 20 may generate a laser pulse 102. The laser pulse 102 may have a pulse width 104. The pulse width 104 may be defined as a time interval at which an intensity and/or amplitude of the pulse 102 halves at a rising time and falling time of the pulse 102. The intensity of the laser pulse 102 may be changed in the pulse width stretcher 30, the pulse amplifier 50, and the pulse width compressor 60. The pulse width stretcher 30 may stretch the pulse width 104 by adjusting dispersion values of the laser pulse 102. When the pulse width 104 is stretched, the intensity of the pulse 102 may reduce. The nonlinear pulse attenuator 40 may reduce a nonlinear dispersion value among the dispersion values of the laser pulse 102. The pulse amplifier 50 may amplify the intensity of the laser pulse 102. The pulse width compressor 60 may compress the pulse width 104 of the laser pulse 102. For example, the intensity of the laser pulse 102 in the pulse width compressor 60 may increase at least about 105 to 106 times the intensity of the laser pulse 102 in the pulse oscillator 20.

Figure 2:
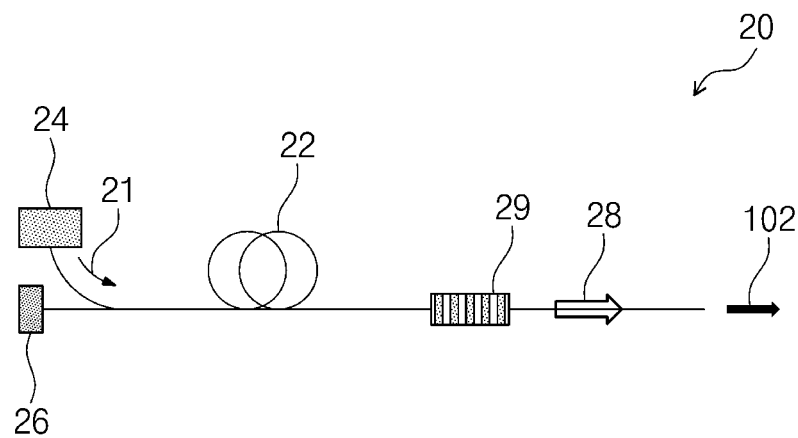
FIG. 2 is a diagram illustrating an example of the pulse oscillator of FIG. 1.

FIG. 2 illustrates an example of the pulse oscillator 20 of FIG. 1.

Referring to FIG. 2, the pulse oscillator 20 may be an optical fiber laser oscillator. For example, the pulse oscillator 20 may include a gain medium optical fiber 22, a first pump light source 24, a reflective mirror 26, an isolator 28, and a first optical grating 29.

The gain medium optical fiber 22 may be connected between the reflective mirror 26 and the isolator 28. The gain medium optical fiber 22 may have a gain medium (e.g., ytterbium (Yb)).

The first pump light source 24 may be connected to the gain medium optical fiber 22. The first pump light source 24 may provide pump light 21 to the gain medium optical fiber 22. The pump light 21 may have a wavelength of about 976 nm. The gain medium optical fiber 22 may obtain a gain of the laser pulse 102 using the pump light 21. The laser pulse 10 may have a wavelength of about 1030 nm. The first pump light source 24 may include a laser diode.

The reflective mirror 26 may be connected to one side of the gain medium optical fiber 22. The reflective mirror 26 may reflect the laser pulse 102 into the gain medium optical fiber 22. The reflective mirror 26 may include a saturable absorber mirror.

The isolator 28 may be connected to another side of the gain medium optical fiber 22. The isolator 28 may reflect a portion of the laser pulse 102 into the gain medium optical fiber 22. Although not illustrated, the isolator 28 may be connected to the pulse width stretcher 30. The isolator 28 may provide a portion of the laser pulse 102 to the pulse width stretcher 30.

The first optical grating 29 may be connected to the gain medium optical fiber 22 between the isolator 28 and the reflective mirror 26. The first optical grating 29 may include a chirped fiber Bragg grating. The first optical grating 29 may generate the laser pulse 102 using the pump light 21.

The laser pulse 102 may have a frequency of about 1 MHz to about 100 MHz. The laser pulse 102 may have a full width at half maximum of about 0.1 nm to about 100 nm. The laser pulse 102 may have a pulse width of about 0.01 ps to about 100 ps. The laser pulse 102 may have output power of about 1 mW to about 1 W.

Figure 3:
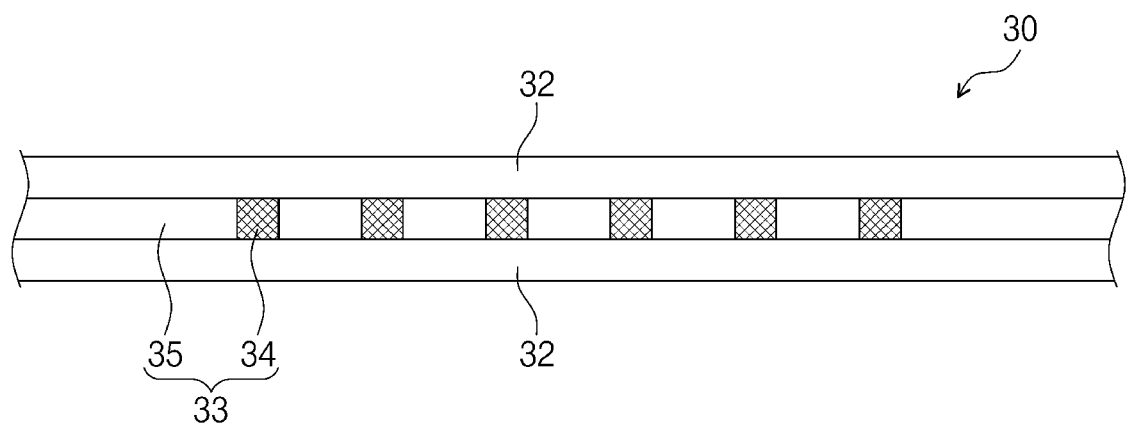
FIG. 3 is a cross-sectional view illustrating an example of the pulse width stretcher of FIG. 1.

FIG. 3 illustrates an example of the pulse width stretcher 30 of FIG. 1.

Referring to FIG. 3, the pulse width stretcher 30 may be an optical fiber pulse width stretcher. For example, the pulse width stretcher 30 may include a cladding 32 and a core 33. The cladding 32 may surround an outer circumferential surface of the core 33. The core 33 may have a higher refractive index than that of the cladding 32. The core 33 may transmit the laser pulse 102. The core 33 may have a Bragg grating structure. The core 33 may include high-refractive portions 34 and low-refractive portions 35. The high-refractive portions 34 and the low-refractive portions 35 may have different refractive indices. The high-refractive portions 34 and the low-refractive portions 35 may be alternately disposed. The high-refractive portions 34 and the low-refractive portions 35 may increase a pulse width 104 and dispersion value of the laser pulse 102.

The dispersion value of the laser pulse 102 may be described as below. The laser pulse 102 may be expressed as Equation 1 by Taylor-expanding a wavenumber function $k(\omega)$ for an angular frequency $\omega$ with respect to a center frequency $\omega_0$. Here, a coefficient of a quadratic term of Equation 1 represents a group velocity dispersion (GVD) value as expressed in Equation 2 below. The GVD value is equal to a group delay dispersion (GDD) value per unit length and a second-order dispersion value per unit length. "L" represents a travel distance of laser. Furthermore, a coefficient of a cubic term of Equation 1 represents a third-order dispersion value per unit length as expressed in Equation 3 below. A coefficient of a fourth-order term of Equation 1 represents a fourth-order dispersion value per unit length as expressed in Equation 4 below.

$$k(\omega) = k_0 + \frac{\partial k}{\partial \omega}(\omega - \omega_0) + \frac{1}{2}\frac{\partial^2 k}{\partial \omega^2}(\omega - \omega_0)^2 + \frac{1}{6}\frac{\partial^3 k}{\partial \omega^3}(\omega - \omega_0)^3 + \ldots \quad (1)$$

$$k'' = \frac{\partial^2 k}{\partial \omega^2} = GVD = \frac{GDD}{L} \quad (2)$$

$$k''' = \frac{\partial^3 k}{\partial \omega^3} \qquad (3)$$

$$k'''' = \frac{\partial^4 k}{\partial \omega^4} \qquad (4)$$

For example, a second-order dispersion value k" may be a linear dispersion value, and a third-order dispersion value k''' and a fourth-order dispersion value k'''' may be nonlinear dispersion values or high-order dispersion values. The linear dispersion value may be proportional to the pulse width 104 of the laser pulse 102. The high-refractive portions 34 and the low-refractive portions 35 may increase the pulse width 104 of the laser pulse 102 by increasing the second-order dispersion value k" of the linear dispersion value of the laser pulse 102. On the contrary, the nonlinear dispersion value may abnormally deform the laser pulse 102, thus reducing output efficiency of the laser pulse 102.

Referring back to FIG. 1, the nonlinear pulse attenuator 40 may reduce the nonlinear dispersion value of the laser pulse 102, thus increasing the output efficiency of the laser pulse 102.

Figure 4:
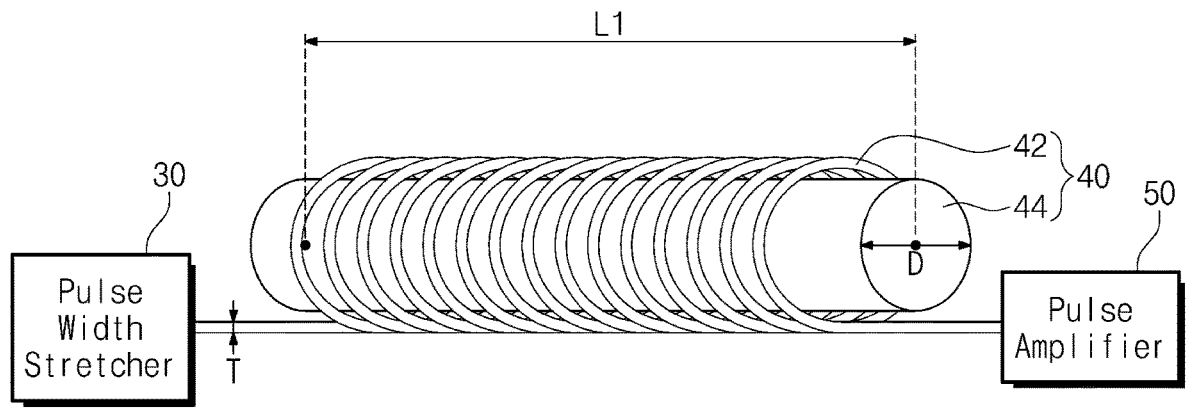
FIG. 4 is a diagram illustrating an example of the nonlinear pulse attenuator of FIG. 1.

FIG. 4 illustrates an example of the nonlinear pulse attenuator 40 of FIG. 1.

Referring to FIG. 4, the nonlinear pulse attenuator 40 may include a nonlinear dispersion filter, a nonlinear dispersion adjuster, a high-order dispersion adjuster, or a high-order dispersion remover. For example, the nonlinear pulse attenuator 40 may include an optical fiber 42 and a bobbin 44.

The optical fiber 42 may connect the pulse width stretcher 30 to the pulse amplifier 50. The optical fiber 42 may transfer the laser pulse 102 between the pulse width stretcher 30 and the pulse amplifier 50. For example, the optical fiber 42 may be deformed to have a coiling and/or spiral shape.

The bobbin 44 may wind the optical fiber 42 therearound so as to deform the optical fiber 42 in a coiling and/or spiral shape. For example, the bobbin 44 may include a circular tube or a circular cylinder. The optical fiber 42 may be wound multiple times around an outer circumferential surface of the bobbin 44 in a longitudinal direction thereof. Although not illustrated, an adhesive tape may be provided on the optical fiber 42. The adhesive tape may fix the optical fiber 42 to the bobbin 44.

Figure 5:
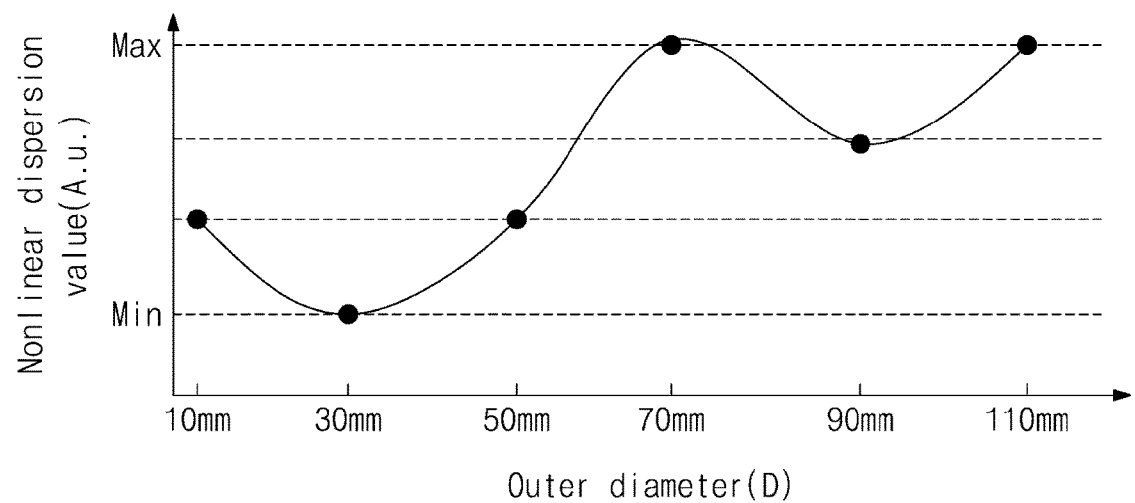
FIG. 5 is a graph illustrating a nonlinear dispersion value according to an outer diameter of a bobbin.

FIG. 5 illustrates a nonlinear dispersion value according to an outer diameter D of the bobbin 44.

Referring to FIG. 5, when the outer diameter D of the bobbin 44 is about 30 mm, the nonlinear dispersion value may reduce to a minimum value. The output efficiency of the laser pulse 102 may increase. When the outer diameter D of the bobbin 44 is about 10 mm and from about 50 mm to about 110 mm, the nonlinear dispersion value may increase. The output efficiency of the laser pulse 102 may reduce.

Figure 6:
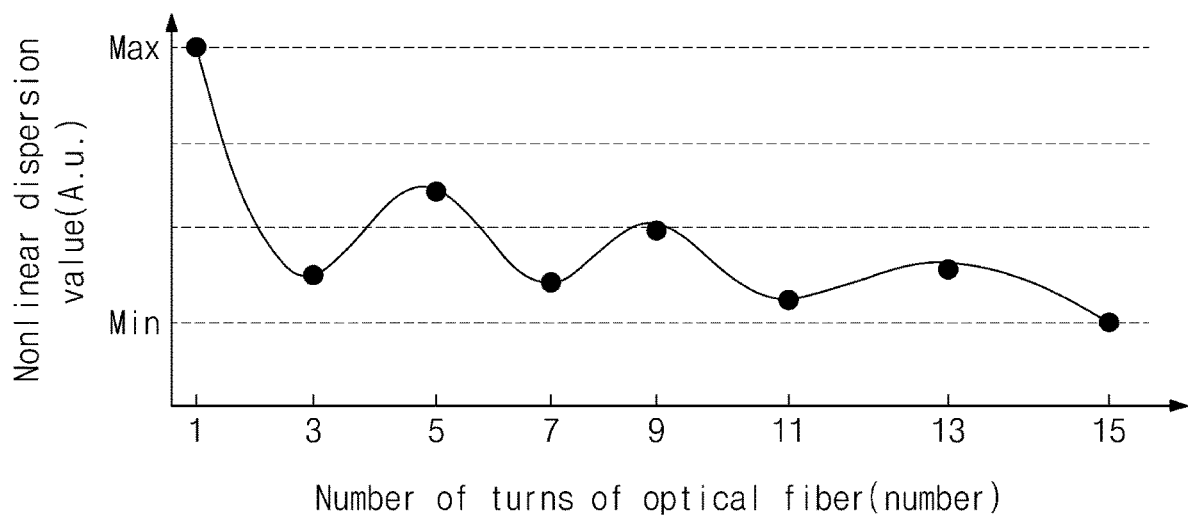
FIG. 6 is a graph illustrating a nonlinear dispersion value according to the number of turns of the optical fiber of FIG. 4.

FIG. 6 illustrates a nonlinear dispersion value according to the number of turns of the optical fiber 42 of FIG. 4.

Referring to FIG. 6, when the optical fiber 42 is wound about at least 15 times around the outer circumferential surface of the bobbin 44, the nonlinear dispersion value may reduce to a minimum value. When the number of turns of the optical fiber 42 increases up to about 15, the nonlinear dispersion value may gradually decrease. The output efficiency of the laser pulse 102 may increase. The bobbin 44 may have a length L1 that is at least 15 times a thickness T and/or diameter of the optical fiber 42. The bobbin 44 with the optical fiber 42 wound therearound about at least 15 times may reduce the nonlinear dispersion value.

Figure 7:
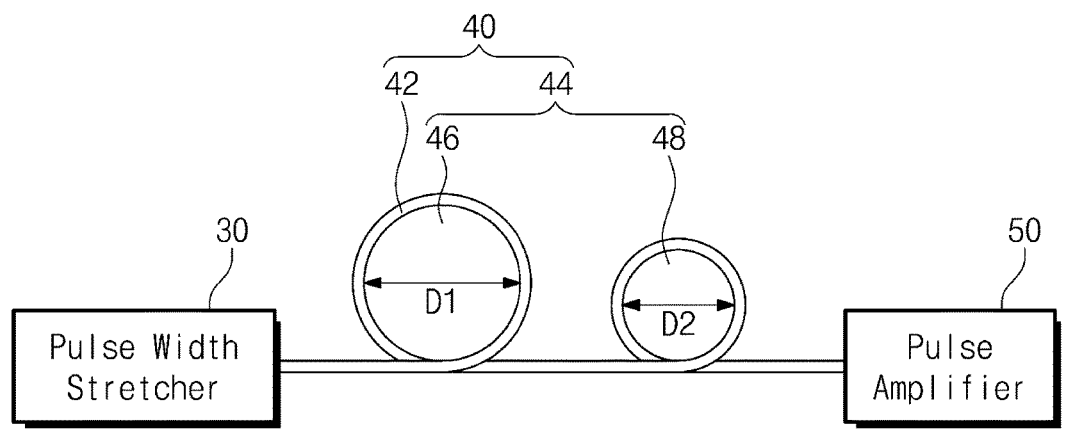
FIG. 7 is a diagram illustrating an example of the nonlinear pulse attenuator of FIG. 1.

FIG. 7 illustrates an example of the nonlinear pulse attenuator 40 of FIG. 1.

Referring to FIG. 7, the bobbins 44 of the nonlinear pulse attenuator 40 may individually wind the optical fiber 42 in a longitudinal direction of the bobbins 44. For example, the bobbins 44 may include a first bobbin 46 and a second bobbin 48. The first bobbin 46 may wind the optical fiber 42 with a first outer diameter D1. The second bobbin 48 may be disposed in parallel to the first bobbin 46. The second bobbin 48 may wind the optical fiber 42 with a second outer diameter D2 that is less than the first outer diameter D1.

Figure 8:
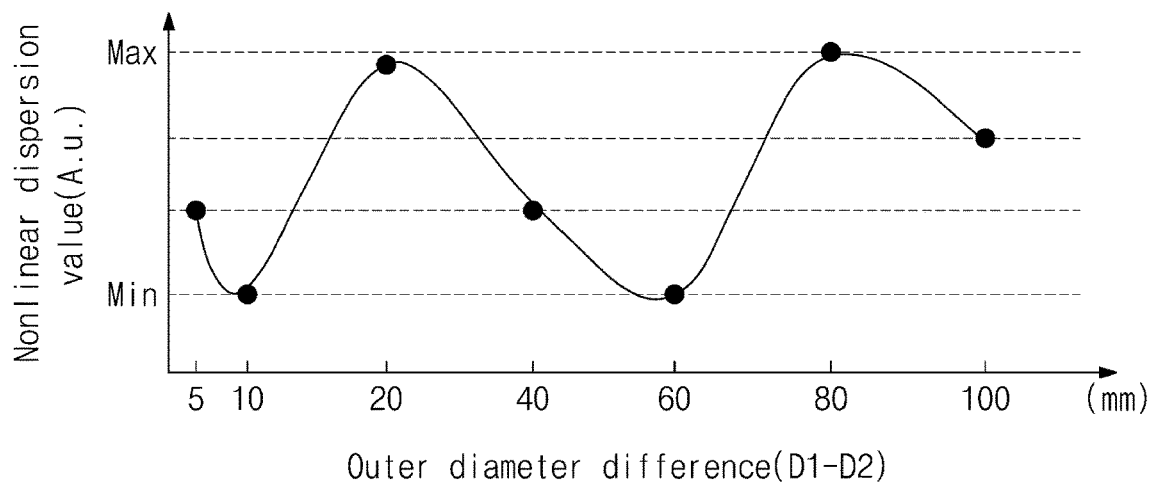
FIG. 8 is a graph illustrating a nonlinear dispersion value according to a difference between the first diameter and the second diameter of FIG. 7.

FIG. 8 illustrates a nonlinear dispersion value according to an outer diameter difference between the first outer diameter D1 and the second outer diameter D2 of FIG. 7.

Referring to FIG. 8, when the outer diameter difference D1-D2 is about 10 mm or about 60 mm, the nonlinear dispersion value may reduce to a minimum value. The output efficiency of the laser pulse 102 may increase. When the outer difference D1-D2 is about 20 mm or about 80 mm, the nonlinear dispersion value may increase. The output efficiency of the laser pulse 102 may reduce.

Figure 9:
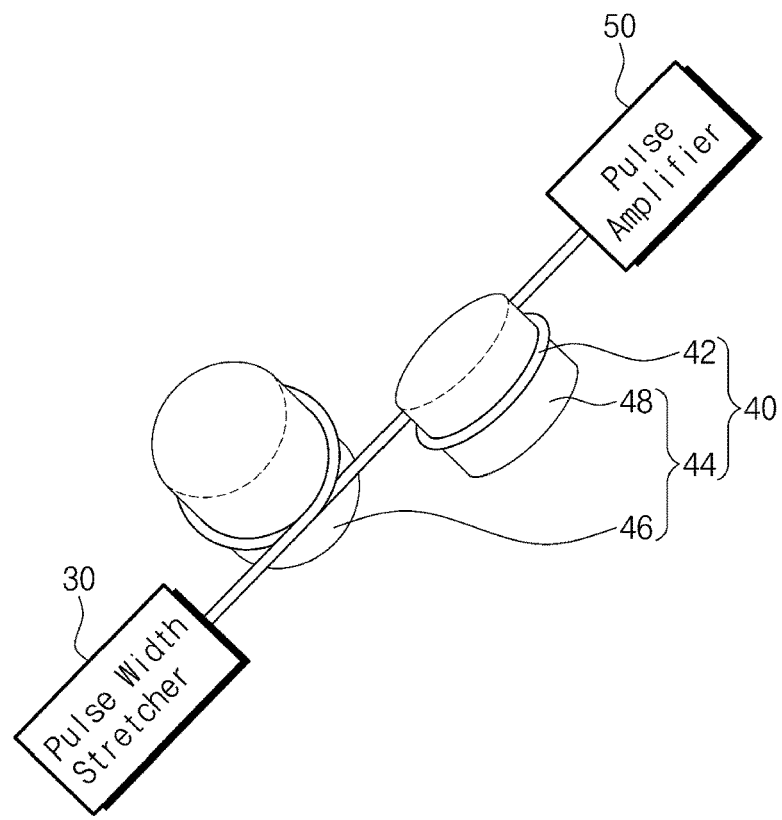
FIG. 9 is a diagram illustrating an example of the first bobbin and the second bobbin of FIG. 7.
Figure 10:
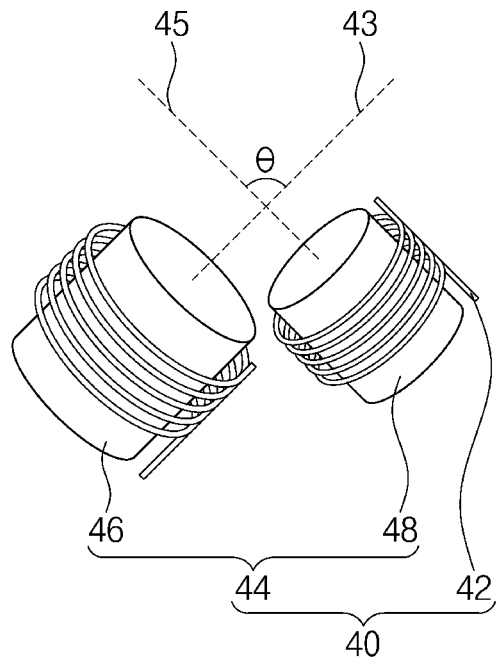
FIG. 10 is a diagram illustrating a crossed angle between the first bobbin and the second bobbin of FIG. 9.

FIG. 9 illustrates an example of the first bobbin 46 and the second bobbin 48 of FIG. 7. FIG. 10 illustrates a crossed angle θ between the first bobbin 46 and the second bobbin 48 of FIG. 9.

Referring to FIGS. 9 and 10, the first bobbin 46 and the second bobbin 48 may be unparallel to each other. For example, the first bobbin 46 and the second bobbin 48 may have a crossed angle θ. The crossed angle θ may be defined between a center axis 43 of the first bobbin 46 and a center axis 45 of the second bobbin 48.

Figure 11:
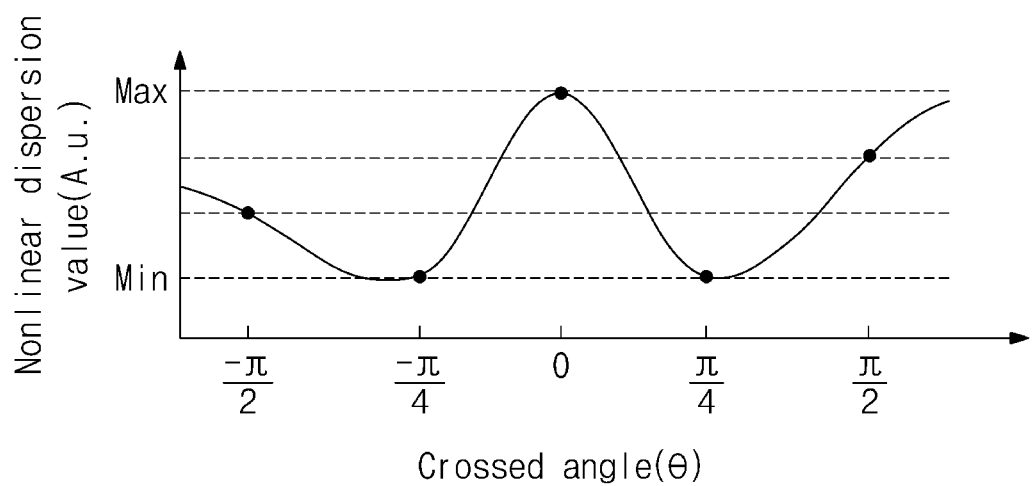
FIG. 11 is a graph illustrating a nonlinear dispersion value according to the crossed angle between the first bobbin and the second bobbin of FIG. 10.

FIG. 11 illustrates a nonlinear dispersion value according to the crossed angle θ between the first bobbin 46 and the second bobbin 48 of FIG. 10.

Referring to FIG. 11, when the crossed angle θ between the first bobbin 46 and the second bobbin 48 is ±π/4, the nonlinear dispersion value may be reduced to a minimum value. The output efficiency of the laser pulse 102 may increase. When the crossed angle θ is 0 or ±π/2, the nonlinear dispersion value may increase. The output efficiency of the laser pulse 102 may reduce.

Figure 12:
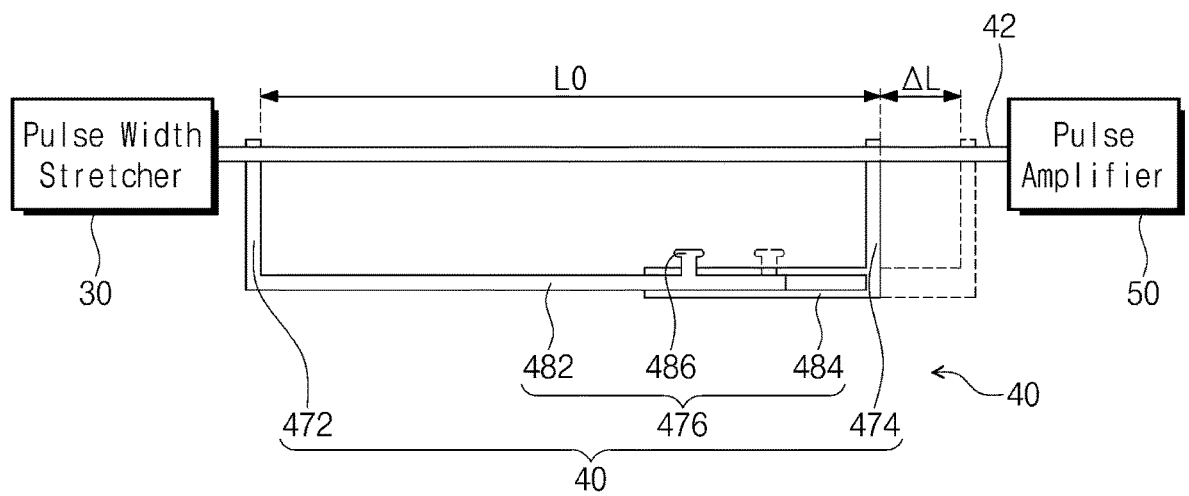
FIG. 12 is a diagram illustrating an example of the nonlinear pulse attenuator of FIG. 1.

FIG. 12 illustrates an example of the nonlinear pulse attenuator 40 of FIG. 1.

Referring to FIG. 12, the nonlinear pulse attenuator 40 may include an optical fiber stretcher 47 for stretching the optical fiber 42. The optical fiber stretcher 47 may adjust the nonlinear dispersion value by stretching the optical fiber 42 in longitudinal direction thereof. For example, the optical fiber 42 having a unit length L0 may be deformed so as to have a stretched length ΔL. For example, the optical fiber stretcher 47 may include a first clamping portion 472, a second clamping portion 474, and a stretching portion 476. The first clamping portion 472 may fix one side of the optical fiber 42. The second clamping portion 474 may fix another side of the optical fiber 42. The stretching portion 476 may connect the first clamping portion 472 to the second clamping portion 474. The stretching portion 476 may adjust a distance between the first clamping portion 472 and the second clamping portion 474. The stretching portion 476 may include a first rod 482, a second rod 484, and a locker 486. The first rod 482 may be connected to the first clamping portion 472, and may be partially inserted into the second rod 484. The second rod 484 may be connected to the second clamping portion 474. The locker 486 may be provided on an overlap region between the first rod 482 and the second rod 484. For example, the locker 486 may include a bolt. When the optical fiber 42 is stretched so as to have the stretched length ΔL, the locker 486 may fix the optical fiber 42 by fixing the first rod 482 and the second rod 484.

Figure 13:
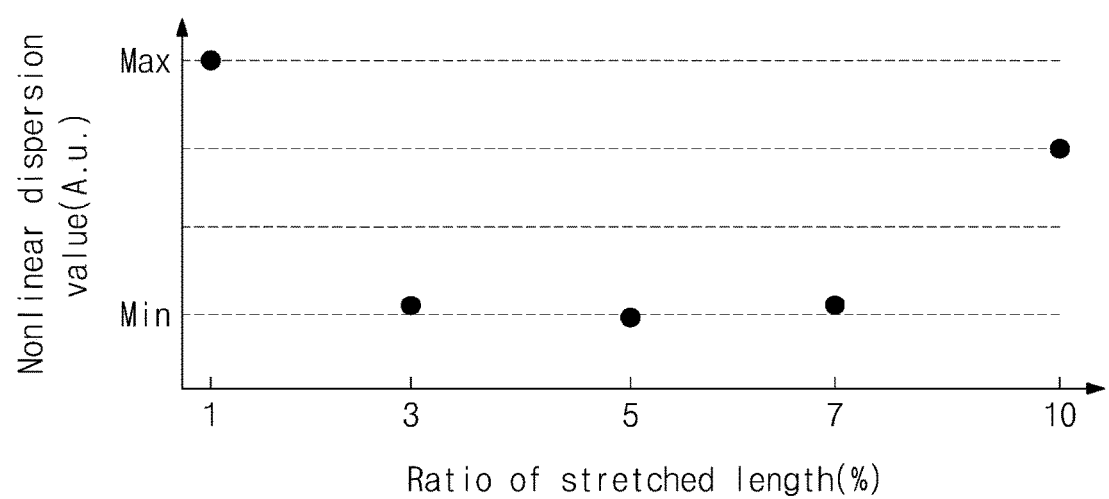
FIG. 13 is a graph illustrating a nonlinear dispersion value according to a ratio of a stretched length to a unit length of the optical fiber of FIG. 12.

FIG. 13 illustrates a nonlinear dispersion value according to a ratio of the stretched length ΔL to the unit length L0 of the optical fiber 42 of FIG. 12.

Referring to FIG. 13, when the ratio of the stretched length ΔL to the unit length L0 is about 5%, the nonlinear dispersion value may reduce to a minimum value. The output efficiency of the laser pulse 102 may increase. When the ratio of the stretched length ΔL to the unit length L0 is less than or greater than about 5%, the nonlinear dispersion value may increase. The output efficiency of the laser pulse 102 may reduce.

Figure 14:
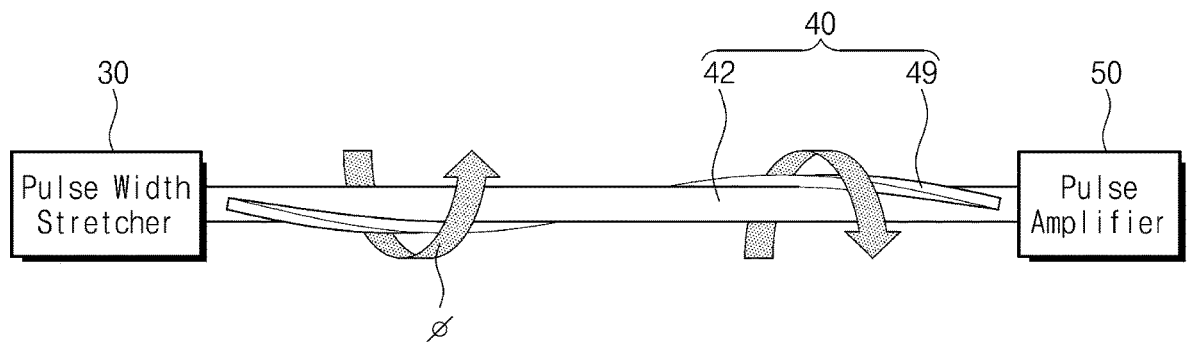
FIG. 14 is a diagram illustrating an example of the nonlinear pulse attenuator of FIG. 1.

FIG. 14 illustrates an example of the nonlinear pulse attenuator 40 of FIG. 1.

Referring to FIG. 14, the nonlinear pulse attenuator 40 may twist the optical fiber 42. For example, the nonlinear pulse attenuator 40 may include the optical fiber 42 and an optical fiber twister 49. The optical fiber 42 may be provided in the optical twister 49. The optical fiber 42 may be deformed so as to be twisted. The optical fiber twister 49 may twist the optical fiber 42 in a direction of twisting angle φ. For example, the optical fiber twister 49 may include a coil spring.

Figure 15:
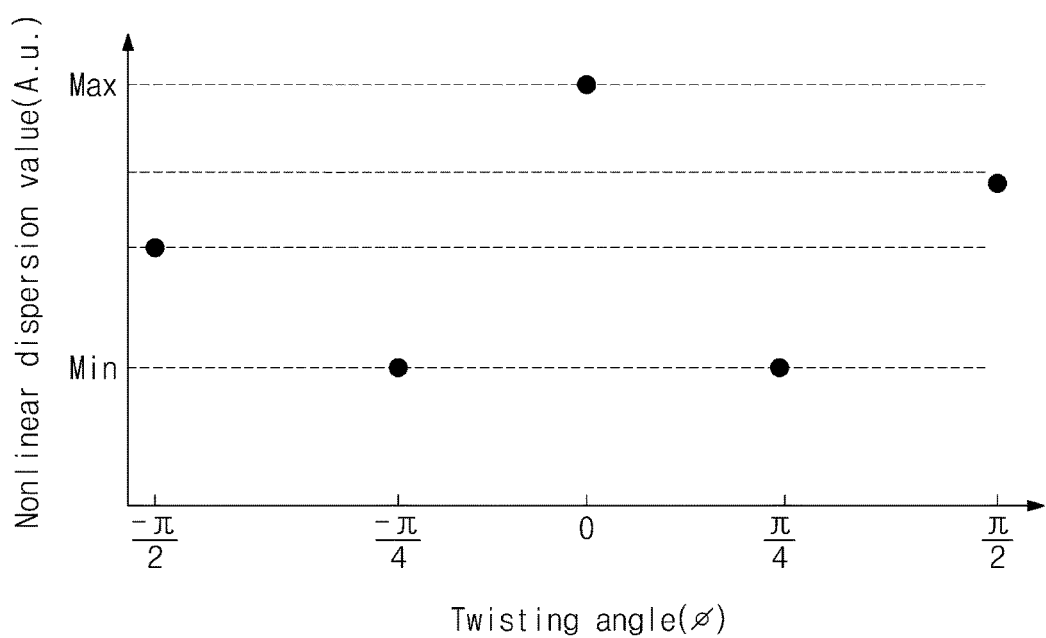
FIG. 15 is a diagram illustrating a nonlinear dispersion value according to the twisting angle of FIG. 14.

FIG. 15 illustrates a nonlinear dispersion value according to the twisting angle φ of FIG. 14.

Referring to FIG. 15, when the twisting angle φ is $\pm\pi/4$, the nonlinear dispersion value may reduce to a minimum value. The output efficiency of the laser pulse 102 may increase. When the twisting angle φ is 0 or $\pm 7\pi/2$, the nonlinear dispersion value may increase. The output efficiency of the laser pulse 102 may reduce.

Referring back to FIG. 1, the pulse amplifier 50 may be provided between the nonlinear pulse attenuator 40 and the pulse width compressor 60. For example, the pulse amplifier 50 may include an optical fiber amplifier. Although not illustrated, the pulse amplifier 50 may include an optical fiber and a gain medium (e.g., ytterbium (Yb), erbium (Er), etc.) in the optical fiber. The pulse amplifier 50 may increase the intensity of the laser pulse 102 by about two to ten times.

Figure 16:
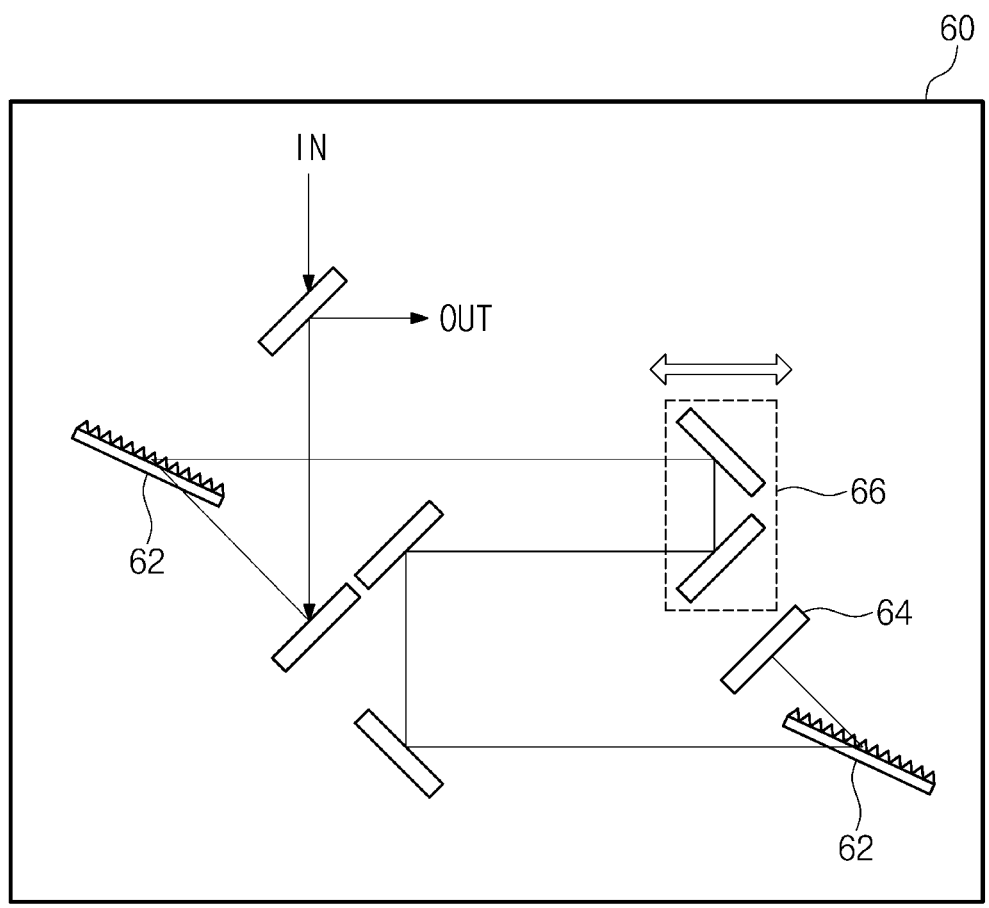
FIG. 16 is a diagram illustrating an example of the pulse width compressor of FIG. 1.

FIG. 16 illustrates an example of the pulse width compressor 60 of FIG. 1.

Referring to FIG. 16, the pulse width compressor 60 may be similar to the pulse width stretcher 30. For example, the pulse width compressor 60 may include second optical gratings 62, a chirped mirror 64, and a dispersion adjustment portion 66. The second optical gratins 62 may diffract and/or disperse the laser pulse 102. The chirped mirror 64 may be disposed on an outer periphery of the second optical gratings 62. The chirped mirror 64 may reflect the laser pulse 102 towards the second optical gratings 62. The dispersion adjustment portion 66 may be provided between the second optical gratings 62. The dispersion adjustment portion 66 may reduce the pulse width 104 of the laser pulse 102 by adjusting an optical distance between the second optical gratings 62. For example, the dispersion adjustment portion 66 may reduce the linear dispersion value and pulse width 104 of the laser pulse 102 by reducing the optical distance between the second optical gratings 62. On the contrary, the nonlinear dispersion value of the laser pulse 102 may not be linearly reduced due to adjustment of the optical distance between the second optical gratins 62.

Referring back to FIGS. 4 to 15, the nonlinear pulse attenuator 40 may reduce and/or remove the nonlinear dispersion value in advance before the pulse width compressor 60, thereby increasing the output efficiency of the laser pulse 102.

As described above, the femtosecond laser device according to an embodiment of the inventive concept may reduce a nonlinear dispersion value of a laser pulse using a nonlinear pulse attenuator including an optical fiber that is deformed to have a spiral shape, stretched length, or twist.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A femtosecond laser device comprising:
   a pulse oscillator configured to generate a laser pulse;
   a pulse width stretcher configured to stretch a width of the laser pulse;
   a pulse width compressor connected to the pulse width stretcher to compress the width of the laser pulse;
   a pulse amplifier disposed between the pulse width compressor and the pulse width stretcher and configured to amplify an intensity of the laser pulse; and
   a nonlinear pulse attenuator including an optical fiber connected between the pulse width amplifier and the pulse width stretcher, the optical fiber deformed to have a spiral shape, a stretched length, or a twisting,
   wherein the nonlinear pulse attenuator further includes a bobbin for winding the optical fiber,
   wherein the bobbin includes:
      a first bobbin having a first diameter; and
      a second bobbin having a second diameter that is less than the first diameter.

2. The femtosecond laser device of claim 1, wherein a difference between the first diameter and the second diameter is 10 mm or 60 mm.

3. The femtosecond laser device of claim 1,
   wherein the first bobbin and the second bobbin have a crossed angle between center axes thereof,
   wherein the crossed angle is $\pm\pi/4$.

4. The femtosecond laser device of claim 1, wherein the bobbin includes a circular tube or a circular cylinder.

5. A femtosecond laser device comprising:
   a pulse oscillator configured to generate a laser pulse;
   a pulse width stretcher configured to stretch a width of the laser pulse;
   a pulse width compressor connected to the pulse width stretcher and configured to compress the width of the laser pulse;
   a pulse amplifier disposed between the pulse width compressor and the pulse width stretcher and configured to amplify an intensity of the laser pulse; and
   a nonlinear pulse attenuator including an optical fiber connected between the pulse amplifier and the pulse width stretcher, the optical fiber deformed to have a spiral shape, a stretched length, or a twisting,
   wherein the nonlinear pulse attenuator further includes an optical fiber stretcher for stretching the optical fiber,
   wherein the optical fiber stretcher includes:
      a first clamping portion fixing one side of the optical fiber;
      a second clamping portion facing the first clamping portion and fixing another side of the optical fiber; and
      a stretching portion connecting the first clamping portion to the second clamping portion,
      wherein the stretching portion includes:
         a first rod connected to the first clamping portion;

a second rod connected to the second clamping portion; and a locker disposed in an overlap region between the first rod and the second rod and fixing the first rod and the second rod.

6. The femtosecond laser device of claim 5, wherein the optical fiber stretcher stretches the optical fiber so that the optical fiber has the stretched length that is 5% longer than an original length of the optical fiber.

7. The femtosecond laser device of claim 5, wherein the locker includes a bolt.

8. A femtosecond laser device comprising:

a pulse oscillator configured to generate a laser pulse;

a pulse width stretcher configured to stretch a width of the laser pulse;

a pulse width compressor connected to the pulse width stretcher to compress the width of the laser pulse;

a pulse amplifier disposed between the pulse width compressor and the pulse stretcher and configured to amplify an intensity of the laser pulse; and a nonlinear pulse attenuator including an optical fiber connected between the pulse amplifier and the pulse width stretcher, the optical fiber deformed to have a spiral shape, a stretched length, or a twisting, wherein the nonlinear pulse attenuator further includes an optical fiber twister for twisting the optical fiber.

9. The femtosecond laser device of claim 8, wherein the optical fiber twister includes a coil spring.

10. The femtosecond laser device of claim 8, wherein the optical fiber twister twists the optical fiber at a twisting angle of $\pm\pi/4$.

* * * * *